United States Patent
Xiong et al.

(10) Patent No.: US 12,361,647 B2
(45) Date of Patent: Jul. 15, 2025

(54) SYSTEM AND METHOD FOR DEPTH AND SCENE RECONSTRUCTION FOR AUGMENTED REALITY OR EXTENDED REALITY DEVICES

(71) Applicant: Samsung Electronics Co., Ltd., Suwon-si (KR)

(72) Inventors: Yingen Xiong, Mountain View, CA (US); Christopher A. Peri, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 169 days.

(21) Appl. No.: 17/811,028

(22) Filed: Jul. 6, 2022

(65) Prior Publication Data

US 2023/0140170 A1     May 4, 2023

Related U.S. Application Data

(60) Provisional application No. 63/272,882, filed on Oct. 28, 2021.

(51) Int. Cl.
   *G06T 19/00*     (2011.01)
   *G06F 3/01*     (2006.01)
   (Continued)

(52) U.S. Cl.
   CPC ........... *G06T 19/006* (2013.01); *G06F 3/012* (2013.01); *G06T 7/593* (2017.01); *G06T 7/73* (2017.01);
   (Continued)

(58) Field of Classification Search
None
See application file for complete search history.

(56) References Cited

U.S. PATENT DOCUMENTS

| | | |
|---|---|---|
| 9,723,290 B2 | 8/2017 | DAmato et al. |
| 11,082,681 B2 | 8/2021 | Godard et al. |

(Continued)

FOREIGN PATENT DOCUMENTS

| | | |
|---|---|---|
| CN | 110009722 A | 7/2019 |
| EP | 2847994 B1 | 11/2020 |

OTHER PUBLICATIONS

International Search Report and Written Opinion of the International Searching Authority dated Feb. 2, 2023 in connection with International Patent Application No. PCT/KR2022/016669, 10 pages.

(Continued)

*Primary Examiner* — Steven Z Elbinger (57) ABSTRACT

A method includes obtaining first and second image data of a real-world scene, performing feature extraction to obtain first and second feature maps, and performing pose tracking based on at least one of the first image data, second image data, and pose data to obtain a 6DOF pose of an apparatus. The method also includes generating, based on the 6DOF pose, first feature map, and second feature map, a disparity map between the image data and generating an initial depth map based on the disparity map. The method further includes generating a dense depth map based on the initial depth map and a camera model and generating, based on the dense depth map, a three-dimensional reconstruction of at least pail of the scene. In addition, the method includes rendering an AR or XR display that includes one or more virtual objects positioned to contact one or more surfaces of the reconstruction.

21 Claims, 5 Drawing Sheets

(51) Int. Cl.
    *G06T 7/593*     (2017.01)
    *G06T 7/73*     (2017.01)
    *H04N 13/239*     (2018.01)
    *H04N 13/00*     (2018.01)

(52) U.S. Cl.
    CPC . *H04N 13/239* (2018.05); *G06T 2207/20084* (2013.01); *G06T 2207/20228* (2013.01); *G06T 2207/30244* (2013.01); *H04N 2013/0081* (2013.01)

(56) References Cited

U.S. PATENT DOCUMENTS

| | | | |
|---|---|---|---|
| 11,688,090 B2 * | 6/2023 | Guizilini | G06T 3/04 |
| | | | 382/104 |
| 2013/0021373 A1 * | 1/2013 | Vaught | G06F 3/013 |
| | | | 345/633 |
| 2016/0094829 A1 | 3/2016 | Georgiev et al. | |
| 2016/0321784 A1 * | 11/2016 | Annapureddy | G06V 10/764 |
| 2018/0292206 A1 * | 10/2018 | Ohki | G06T 7/55 |
| 2018/0307310 A1 | 10/2018 | McCombe et al. | |
| 2020/0193623 A1 * | 6/2020 | Liu | G06N 3/04 |
| 2020/0273192 A1 * | 8/2020 | Cheng | G06V 10/454 |
| 2020/0301500 A1 * | 9/2020 | Wilde | G06F 3/04845 |
| 2020/0358997 A1 | 11/2020 | O'Keefe et al. | |
| 2020/0394759 A1 | 12/2020 | Luo et al. | |
| 2021/0004979 A1 * | 1/2021 | Valentin | G06T 19/006 |
| 2021/0011289 A1 | 1/2021 | Fortin-Deschenes et al. | |
| 2021/0019949 A1 | 1/2021 | Ulbricht et al. | |
| 2021/0082135 A1 | 3/2021 | Xu et al. | |
| 2021/0142095 A1 * | 5/2021 | Shi | G06N 3/045 |
| 2021/0174479 A1 | 6/2021 | Li et al. | |
| 2021/0348927 A1 * | 11/2021 | Imai | G01C 21/206 |
| 2023/0260232 A1 * | 8/2023 | Purohit | G06F 3/011 |
| | | | 345/633 |
| 2024/0005628 A1 * | 1/2024 | Cai | G06V 10/811 |

OTHER PUBLICATIONS

Supplementary European Search Report dated Nov. 7, 2024 in connection with European Patent Application No. 22887688.4, 7 pages.

* cited by examiner

SYSTEM AND METHOD FOR DEPTH AND SCENE RECONSTRUCTION FOR AUGMENTED REALITY OR EXTENDED REALITY DEVICES

CROSS-REFERENCE TO RELATED APPLICATION AND CLAIM OF PRIORITY

This application claims priority under 35 U.S.C. § 119(e) to U.S. Provisional Patent Application No. 63/272,882 filed on Oct. 28, 2021. The above-identified provisional patent application is hereby incorporated by reference in its entirety.

TECHNICAL FIELD

This disclosure relates to systems and methods for generating augmented reality (AR) and extended reality (XR) displays that combine image data of real-world objects of a user's current operating environment (such as walls, floors, or furniture) with virtual objects presented to appear as elements of the real-world operating environment. More specifically, this disclosure relates to a system and method for performing depth and scene reconstruction for AR or XR devices.

BACKGROUND

Smartphones, tablets, and other readily portable, battery-powered devices have displaced or become peer devices to many users' notebooks or personal computers in the past two decades. Additionally, the overall push towards smaller, more personalized computing platforms has markedly increased the adoption of wearable, head-mounted devices for providing users with augmented reality (AR) and/or extended reality (XR) displays. These devices provide displays that combine views of real-world operating environments (either as rendered displays or through transparent glasses) in combination with virtual objects that are rendered at locations and posed so that they appear to be positioned on real-world objects in users views.

In many cases, rendering and displaying an AR or XR display involves a portable, head-worn computing platform (such as AR glasses or an XR headset) developing a machine-level understanding of the three-dimensional structure of the real-world operating environment in order to render virtual objects at positions and poses where they appear to be interacting with real-world objects. To do this, an apparatus providing an AR or KR display often needs to ingest and analyze image data in real-time or near-real-time in order to recalculate how to render and reproject items of AR or XR content whenever a user's pose changes. In portable, battery-powered devices such as AR glasses and XR headsets, system performance is generally a function having multiple dimensions, including, without limitation, the frame rate of the AR or XR display (variations in frame rate can cause nausea in some users), the battery life of the device, and managing limited processing resources between multiple processes and applications. Thus, the technical challenges associated with providing AR or XR displays include, without limitation, obtaining a scene understanding without adversely affecting performance along other dimensions of system performance. Performing three-dimensional scene reconstruction and developing a machine-level understanding of an operating environment to support an AR or XR display at a portable device while, at the same time, minimizing degradation of other aspects of system performance (such as frame rate, battery life, and processor use) remains a source of technical challenges.

SUMMARY

This disclosure provides a system and method for performing depth and scene reconstruction for augmented reality (AR) or extended reality (XR) devices.

In a first embodiment, a method for obtaining a three-dimensional scene reconstruction and dense depth map for an augmented reality (AR) or extended reality (XR) display includes obtaining, at a first time, first image data of a real-world scene from a first camera of a stereoscopic pair of an apparatus and second image data of the real-world scene from a second camera of the stereoscopic pair. The method also includes performing feature extraction on the first image data to obtain a first feature map, performing feature extraction on the second image data to obtain a second feature map, and performing pose tracking based on at least one of the first image data, the second image data, and pose data from an inertial measurement unit (IMU) of the apparatus to obtain a six-degree-of-freedom (6DOF) pose of the apparatus. The method further includes generating, based on the 6DOF pose of the apparatus, the first feature map, and the second feature map, a disparity map between the first and second image data and generating an initial depth map based on the disparity map. The method also includes generating a dense depth map of the real-world scene based on the initial depth map and a camera model of the apparatus and generating, based on the dense depth map, a three-dimensional reconstruction of at least part of the real-world scene. In addition, the method includes rendering an AR or XR display, where the AR or XR display includes one or more virtual objects positioned to contact one or more surfaces of the three-dimensional reconstruction of at least part of the real-world scene.

In a second embodiment, an apparatus includes a stereoscopic pair of cameras including a first camera and a second camera, an IMU, and at least one processing device. The at least one processing device is configured to obtain, at a first time, first image data of a real-world scene from the first camera and second image data of the real-world scene from the second camera. The at least one processing device is also configured to perform feature extraction on the first image data to obtain a first feature map, perform feature extraction on the second image data to obtain a second feature map, and perform pose tracking based on at least one of the first image data, the second image data, and pose data from the IMU to obtain a 6DOF pose of the apparatus. The at least one processing device is further configured to generate, based on the 6DOF pose of the apparatus, the first feature map, and the second feature map, a disparity map between the first and second image data. The at least one processing device is also configured to generate an initial depth map based on the disparity map, generate a dense depth map of the real-world scene based on the initial depth map and a camera model of the apparatus, and generate, based on the dense depth map, a three-dimensional reconstruction of at least part of the real-world scene. In addition, the at least one processing device is configured to render an AR or XR display, where the AR or XR display includes one or more virtual objects positioned to contact one or more surfaces of the three-dimensional reconstruction of at least part of the real-world scene.

In a third embodiment, a non-transitory computer-readable medium contains instructions that, when executed by at least one processor of an apparatus including a stereoscopic pair of cameras having a first camera and a second camera and an MU, cause the apparatus to obtain, at a first time, first image data of a real-world scene from the first camera and second image data of the real-world scene from the second camera. The medium also contains instructions that, when executed by the at least one processor, causes the apparatus to perform feature extraction on the first image data to obtain a first feature map, perform feature extraction on the second image data to obtain a second feature map, and perform pose tracking based on at least one of the first image data, the second image data, and pose data from the IMU to obtain a 6DOF pose of the apparatus. The medium further contains instructions that, when executed by the at least one processor, causes the apparatus to generate, based on the 6DOF pose of the apparatus, the first feature map, and the second feature map, a disparity map between the first and second image data and generate an initial depth map based on the disparity map. The medium also contains instructions that, when executed by the at least one processor, causes the apparatus to generate a dense depth map of the real-world scene based on the initial depth map and a camera model of the apparatus and generate, based on the dense depth map, a three-dimensional reconstruction of at least part of the real-world scene. In addition, the medium contains instructions that, when executed by the at least one processor, causes the apparatus to render an AR or XR display, where the AR or XR display includes one or more virtual objects positioned to contact one or more surfaces of the three-dimensional reconstruction of at least part of the real-world scene.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory, random access memory, a hard disk drive, a compact disc, a digital video disc, or any other type of memory. A "non-transitory" computer readable medium excludes wired, wireless, optical, or other communication links that transport transitory electrical or other signals. A non-transitory, computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages; reference is now made to the following description, taken in conjunction with the accompanying drawings; in which.

DETAILED DESCRIPTION

FIGS. 1 through 5, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

Figure 1:
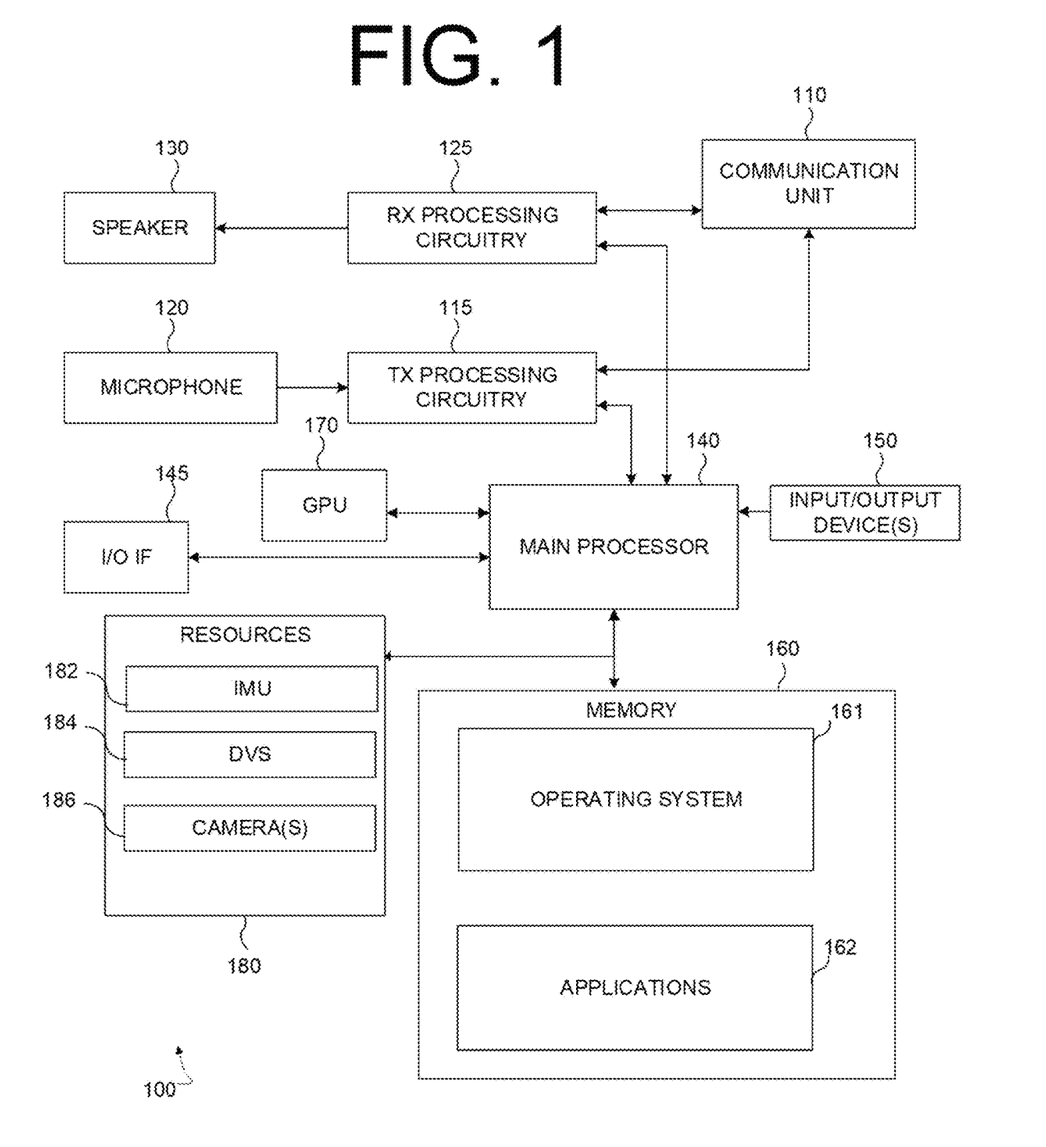
FIG. 1 illustrates an example of an electronic device for performing three-dimensional scene reconstruction and comprehension according to some embodiments of this disclosure.

FIG. 1 illustrates a non-limiting example of a device 100 operating as a processing platform for providing an augmented reality (AR) or extended reality (XR) display, such as for an AR or XR headset. In some embodiments, the components described with reference to FIG. 1 are components of the AR or XR headset. In other embodiments, at least some of the components described with reference to FIG. 1 are components of an accessory device (such as a smartphone) communicatively connected to the AR or XR headset. The embodiment of the device 100 shown in FIG. 1 is for illustration only, and other configurations are possible. Suitable devices come in a wide variety of configurations, and FIG. 1 does not limit the scope of this disclosure to any particular implementation of a device.

As shown in the non-limiting example of FIG. 1, the device 100 includes a communication unit 110 that may include, for example, a radio frequency (RF) transceiver, a BLUETOOTH transceiver, or a WI-FI transceiver, etc. The device 100 also includes transmit (TX) processing circuitry 115, a microphone 120, and receive (RX) processing circuitry 125. The device 100 further includes a speaker 130, a main processor 140, an input/output (I/O) interface (IF) 145, I/O device(s) 150, and a memory 160. The memory 160 includes an operating system (OS) program 161 and one or more applications 162.

Applications 162 can include games, social media applications, applications for geotagging photographs and other items of digital content, virtual reality (VR) applications, augmented reality (AR) applications, extended reality (XR) applications, operating systems, device security (such as anti-theft and device tracking) applications, or any other applications that access resources of the device 100. The resources of the device 100 may include, without limitation, the speaker 130, microphone 120, I/O devices 150, and additional resources 180. According to some embodiments, applications 162 include XR applications that can project, on a display device, an XR display that combines elements of a view of a real-world operating environment of the device 100 in combination with one or more virtual objects, where each virtual object's position or dynamics embody a physical interaction (such as appearing to sit on a real-world table or bouncing off of a wall of a room) with a physical object of the real-world operating environment.

The communication unit 110 may receive an incoming RF signal, such as a near field communication signal like a BLUETOOTH or WI-FI signal. The communication unit 110 can down-convert the incoming RF signal to generate an intermediate frequency (IF) or baseband signal. The IF or baseband signal is sent to the RX processing circuitry 125, which generates a processed baseband signal by filtering, decoding, or digitizing the baseband or IF signal. The RX processing circuitry 125 transmits the processed baseband signal to the speaker 130 (such as for voice data) or to the main processor 140 for further processing (such as for web browsing data, online gameplay data, notification data, or other message data). Additionally, the communication unit 110 may contain a network interface, such as a network card, or a network interface implemented through software.

The TX processing circuitry 115 receives analog or digital voice data from the microphone 120 or other outgoing baseband data (such as web data, e-mail, or interactive video game data) from the main processor 140. The TX processing circuitry 115 encodes, multiplexes, or digitizes the outgoing baseband data to generate a processed baseband or IF signal. The communication unit 110 receives the outgoing processed baseband or IF signal from the TX processing circuitry 115 and up-converts the baseband or IF signal to an RF signal for transmission.

The main processor 140 can include one or more processors or other processing devices and execute the OS program 161 stored in the memory 160 in order to control the overall operation of the device 100. For example, the main processor 140 could control the reception of forward channel signals and the transmission of reverse channel signals by the communication unit 110, the RX processing circuitry 125, and the TX processing circuitry 115 in accordance with well-known principles. In some embodiments, the main processor 140 includes at least one microprocessor or microcontroller.

The main processor 140 is also capable of executing other processes and programs resident in the memory 160. The main processor 140 can move data into or out of the memory 160 as required by an executing process. In some embodiments, the main processor 140 is configured to execute the applications 162 based on the OS program 161 or in response to inputs from a user or applications 162. Applications 162 can include applications specifically developed for the platform of device 100 or legacy applications developed for earlier platforms. Additionally, the main processor 140 can be manufactured to include program logic for implementing techniques for monitoring suspicious application access according to some embodiments of this disclosure. The main processor 140 is also coupled to the I/O interface 145, which provides the device 100 with the ability to connect to other devices such as laptop computers and handheld computers. The I/O interface 145 is the communication path between these accessories and the main processor 140.

The main processor 140 is also coupled to the I/O device(s) 150. The operator of the device 100 can use the I/O device(s) 150 to enter data into the device 100. The I/O device(s) 150 can include a keyboard, HMI), touchscreen, mouse, track ball, or other device(s) capable of acting as a user interface to allow a user to interact with the device 100. In some embodiments, the I/O device(s) 150 can include a touch panel, a (digital) pen sensor, a key, or an ultrasonic input device.

The I/O device(s) 150 can include one or more screens, which can be a liquid crystal display, a light-emitting diode (LED) display, an optical LED (OLED), an active-matrix OLEO (AMOLED), or other screen(s) capable of rendering graphics. In some embodiments, the I/O devices 150 include one or more devices (such as in an HMD) that project items of AR or KR content upon a clear lens.

The memory 160 is coupled to the main processor 140. According to some embodiments, part of the memory 160 includes a random-access memory (RAM), and another part of the memory 160 includes a Flash memory or other read-only memory (ROM).

According to some embodiments, the device 100 can further include a separate graphics processing unit (GPU) 170.

Also, according to some embodiments, the device 100 may further include a variety of additional resources 180 that can, if permitted, be accessed by the applications 162. According to particular embodiments, the additional resources 180 may include an accelerometer or inertial motion unit 182, which can detect movements of the device 100 along one or more degrees of freedom. As another example, according to particular embodiments, the additional resources 180 may include a dynamic vision sensor (DVS) 184 or one or more cameras 186.

Although FIG. 1 illustrates one example of a device 100 operating as a processing platform for providing an AR or XR display, various changes may be made to FIG. 1. For example, the device 100 could include any number of components in any suitable arrangement. In general, devices including computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
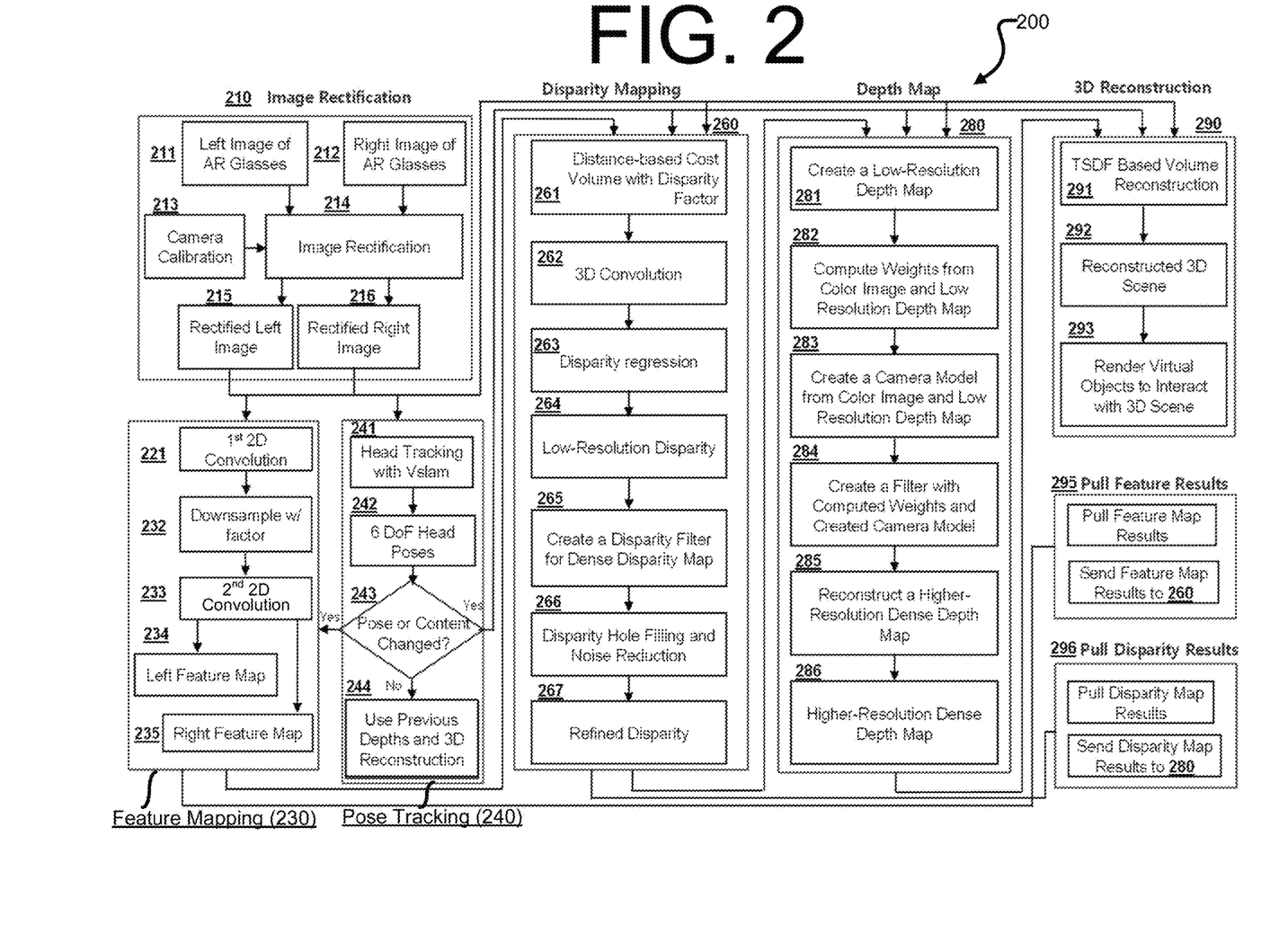
FIG. 2 illustrates an example of an architecture for performing three-dimensional scene reconstruction according to some embodiments of this disclosure.

FIG. 2 illustrates an example of an architecture for 200 performing three-dimensional scene reconstruction according to some embodiments of this disclosure. The operations described with reference to FIG. 2 may be performed by any suitably-configured processing platform(s), such as a pair of AR or XR glasses, smartphone, smartphone communicatively connected to and operating as an accessory device with AR or XR glasses, or other device 100 in FIG. 1.

As discussed elsewhere in this disclosure, technical challenges associated with performing scene reconstruction and depth mapping at a portable, battery-powered processing platform (such as AR or XR glasses or a smartphone) include preventing computational loads associated with scene reconstruction from negatively affecting other dimensions of the system's performance and user experience, such as frame rate, battery life, and performance of other applications executing at the platform. The architecture 200 addresses these technical challenges by, without limitation, providing a processing architecture that can avoid unnecessary scene reconstruction operations and throttle processing loads associated with scene reconstruction and depth mapping to avoid unacceptable performance losses elsewhere (such as unusually slow frame rates or frozen applications).

Referring to the illustrative example of FIG. 2, in some embodiments according to this disclosure, scene reconstruction and depth mapping in support of an AR or XR display may be performed based on image data and calculating distances based on projection differences between two images of a scene as captured by a stereoscopic pair of cameras. Accordingly, the architecture 200 includes an image rectification stage 210, where input data includes first image data 211 from a first camera (such as a camera on the left side of an AR or XR headset) and second image data 212 from a second camera (such as a camera on the right side of the AR or XR headset).

At an operation 214, the processing platform performs image rectification of the first image data 211 and the second image data 212 to obtain a first rectified image 215 and a second rectified image 216. Image rectification may include processing image data to compensate for factors other than a difference in viewpoint between first and second cameras that cause first image data to appear different from second image data. Examples of such factors include, without limitation, variances in pose, effective focal length, and orientation of the image sensors. Using camera calibration information 213, the first image data 211 and second image data 212 can be rectified and modified to remove the effects of non-parallax-based differences in the image data. In some cases, the camera calibration information 213 may be obtained by capturing images of the same subject (such as a test card) from the same pose, computing a perceptual hash or otherwise analyzing the obtained images to ascertain differences, calculating initial calibration values, correcting one or both images based on the calibration values, and repeating the process until corrected images are identical.

As shown in the explanatory example of FIG. 2, the first and second rectified images 215 and 216 are passed to a feature mapping stage 230, which identifies common features (such as corners and edges of objects) in both the first rectified image 215 and the second rectified image 216. This allows a disparity map to be generated and depths to be calculated from the differences in the location and appearance of common features across the first and second rectified images 215-216. According to various embodiments, feature extraction is performed using a neural network with a U-net architecture, where earlier versions of a feature map may be extracted from intermediate layers of the network. This reduces processing bottlenecks associated with feature maps only being available in a final layer of the model.

According to various embodiments, at an operation 221, a first two-dimensional convolution is performed on the first and second rectified images 215 and 216, where each image is passed through an initial filter to encode its image data as values indicating triggering of a filter for recognizing an instance of a predefined feature. At an operation 232, outputs of the first two-dimensional convolution are downsampled according to a downsampling factor, where the downsampling factor is a tunable parameter that affects the processing load associated with feature extraction. For instance, increasing the downsampling factor may decrease the processing load associated with feature extraction, albeit at the expense of accuracy in feature recognition. In some embodiments, the downsampling factor may be tuned in response to a current load on the processing platform. Thus, if other applications are consuming significant processing or memory resources, the downsampling factor may be increased. At an operation 233, the downsampled convolutions of the first and second rectified images 215 and 216 are passed to a second convolutional layer for decoding and upsampling to create a first feature map 234 mapping recognized features in the first rectified image 215 and a second feature map 235 mapping recognized features in the second rectified image 216.

Referring to the illustrative example of FIG. 2, the first and second rectified images 215 and 216 are also passed to a pose tracking stage 240. A pose may represent a quantification of the position and direction of first and second cameras of a device (such as AR or XR glasses or another device) relative to the real-world operating environment. In this example, the pose tracking stage 240 outputs a six-degree-of-freedom ("6DOF") pose value for the device, such as a three-dimensional expression (such as values in a Cartesian coordinate system) of the device's location within the real-world operating environment and a three dimensional expression of the device's viewing angle (such as values of roll, pitch, and yaw).

In addition to scene reconstruction and understanding objects and surfaces in a real-world operating environment, presenting an AR or XR display in which one or more virtual objects are rendered as appearing to sit on or otherwise interact with one or more real-world objects in the environment involves pose understanding. This helps to create a realistic AR or XR display, since each virtual object's appearance typically needs to change in response to changes in pose. That is, in addition to developing a machine-level understanding of what it is looking at in a real-world scene (such as scene and depth reconstruction), presenting an AR or XR display typically involves the processing platform understanding how it is looking at the scene (such as determining a pose).

As shown in FIG. 2, at an operation 241, the processing platform performs Visual-Inertial Simultaneous Localization and Mapping ("VISLAM") to obtain a 6DOF pose 242 for the AR or XR display. According to various embodiments, the operation 241 may be implemented using a combination of the first and second rectified images 215 and 216 and inertial sensor data, such as data obtained from an inertial measurement unit ("IMU") or other sensor disposed on the same apparatus as the first and second cameras. The operation 241 may be performed using any suitable VIS- LAM algorithms, including, without limitation, the RGBD-SLAM and RTABMap algorithms, or other algorithms.

Referring to the illustrative example of FIG. 2, at an operation 243, a determination is performed as to whether one or more of the pose of the apparatus or the contents of one or both rectified images 215-216 has changed. For example, in some embodiments, the determination of whether the image content has changed may include calculating a perceptual hash comparing a current rectified image frame against a previously-obtained rectified image frame to obtain a quantification of the differences in the images. Where the quantified value of the differences between present and earlier images is below a threshold value, the architecture 200 proceeds to an operation 244, where previously-determined depths and three-dimensional reconstruction of the scene are re-used, thereby avoiding waste of battery and processor resources associated with recalculating a depth map and three-dimensional reconstruction in the absence of any substantive change of view. Instead, the processing architecture 200 revers back to the image rectification stage 210, which can process new images from the first and second cameras. However, when the operation 243 indicates that the difference between the present and past image frames exceeds a similarity threshold (such as due to activity in the scene or a change of pose), a feature mapping stage 230, a disparity mapping stage 260, a depth mapping stage 280, and a three-dimensional reconstruction stage 290 may be performed.

As shown in FIG. 2, where the comparison performed at the operation 243 indicates one or both of a change in the image data of the real-world operating environment or a change of pose, the disparity mapping stage 260 is performed. According to various embodiments, the disparity mapping stage 260 generates a disparity map of a region of overlap between the fields of view of the first rectified image 215 and the second rectified image 216. This may, for example, involve performing a distance-based cost volume determination of the disparities between the first and second feature maps. Depending on the structure of the real-world scene (such as the distribution of recognizable objects within the shared fields of view of the first and second cameras and the magnitude of the downsampling factor applied at the operation 232), generating the disparity map may involve calculating disparities in the regions covered by the first and second feature maps 234 and 235 and determining disparity values in regions where there are inaccuracies or gaps in the feature maps. While the explanatory example of FIG. 2 describes generating the disparity map using a volumetric neural network technique, other techniques are possible and within the contemplated scope of this disclosure, such as direct regression techniques that try to estimate per-pixel disparities between source images.

Referring to the illustrative example of FIG. 2, at an operation 261, the processing platform passes the first and second feature maps 234 and 236 to one or more neural networks that build a multi-dimensional feature volume, such as by concatenating features from detected disparity shifts (like differences in locations of a feature common to both the first and second feature maps 234 and 235). In some embodiments according to this disclosure, at the operation 261, the processing platform concatenates the first and second feature maps 234 and 235 and determines voxels, where each voxel is associated with a coordinate value and a cost value for matching features as projected from the left and right camera views. According to some embodiments, the operation 261 is performed using a neural network having a U-net architecture in which different versions of the disparity map can be obtained from different layers of the network, where each layer is associated with a disparity factor value. Higher disparity factor values correspond to deeper calculations, which are more accurate but also entail higher computational costs. Thus, the disparity factor can be tuned according to the present demands of the processing platform such that, where processing, time (such as time until another frame needs to be rendered), and memory resources are abundant, a greater disparity factor may be applied. Similarly, when circumstances limit available resources, the computational complexity of performing a distance-based cost volume calculation at the operation 261 may be reduced by lowering the complexity factor.

At an operation 262, a matching network (such as a pyramid stereo matching network (PSMNet)) identifies disparities within the concatenation of the first and second feature maps obtained at the operation 261. At an operation 263, a disparity regression is calculated to obtain a low-resolution disparity map 264. At an operation 265, a disparity filter is applied to the low-resolution disparity map 264 to sharpen the map and increase the data density within the disparity filter. According to various embodiments, the filter applied at the operation 265 is a guided filter, which operates similarly to certain edge-restoring filters and utilizes image data (such as the first and second rectified images 215 and 216) to restore details in the low-resolution disparity map 264.

As shown in FIG. 2, at an operation 266, noise reduction and hole-filling are performed on the dense disparity map. According to some embodiments, where an image-guided filter is used to generate the dense disparity map at the operation 265, the filter may also smooth out and remove noisy artifacts within the disparity map. Depending on a variety of factors including, without limitation, the downsampling factor used at the operation 232, there may be "holes" or regions in which no disparity is calculable. Among other reasons, this may be due to an inability to match features in the first feature map 234 with the second feature map 235 (such as when there is no inherent guarantee that a feature in the first feature map 234 will necessarily have a counterpart instance in the second feature map 235). Hole filling may be performed using any suitable reconstruction technique, including, without limitation, exemplar-based inpainting, to obtain a refined disparity map 267.

Referring to the non-limiting example of FIG. 2, the depth mapping stage 280 operates as a processing pipeline for generating a dense depth map 286. A dense depth map may include a cloud of coordinate point values associated with a specific distance value (such as depth) relative to an apparatus (as opposed to voxels or other quantifications of location with an area). The dense depth map generated by the depth mapping stage 280 may be used by the reconstruction stage 290 to obtain a three-dimensional reconstruction of the scene. A three-dimensional reconstruction may include a machine-level representation of the three-dimensional structure of a scene, such as the locations, sizes, and shapes of planes and solid objects in the scene. Examples of three-dimensional reconstructions according to some embodiments of this disclosure include dense surface meshes and incremental meshes.

At an operation 281, an initial low-resolution depth map is calculated from the refined disparity map 267. According to various embodiments, generating the low-resolution depth map includes translating disparity values to depth values, where the depth values are proportional to the product of the distance between the cameras of a stereoscopic pair (such as the left and right cameras of a pair of AR or XR glasses) and the focal length of the cameras of the stereoscopic pair divided by the observed disparity in the location of the features. In this approach, lower disparities are associated with greater depths.

At an operation 282, filtering weights for a depth filter are computed based on image data (such as the first or second rectified images 215 and 216). According to various embodiments, the depth map is extended or "filled in" using an image-guided filter around an existing data point based on the extent to which the image data shows consistency in the neighborhood around the existing depth point. Thus, where the image data shows pixels of image data in the neighborhood of the existing depth point having similar values in one or more channels of a color space, weighting values can indicate that the depth value of the existing depth may be applied to the neighborhood of the depth point. By contrast, where the image data shows image variability in the neighborhood of the depth point, weighting values that limit the extension of the existing depth value to the neighborhood may be determined. In this way, the contours of the depth map (and by implication the contours of the three-dimensional reconstruction) may more accurately track those of real-world objects than if the depth map is generated by simple interpolation. An approach for calculating weights for image guided reconstruction of a sparse depth map is described in U.S. Patent Application Publication No. 2021/0358158, the contents of which are hereby incorporated by reference.

Figure 4A:
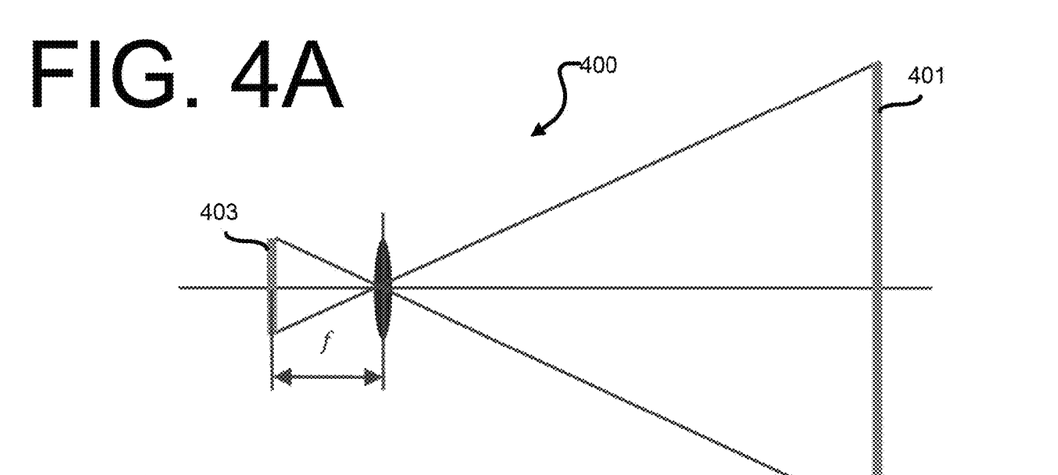
FIGS. 4A-4C illustrate examples of virtual cameras from which camera models for generating dense depth maps may be obtained according to some embodiments of this disclosure.
Figure 4B:
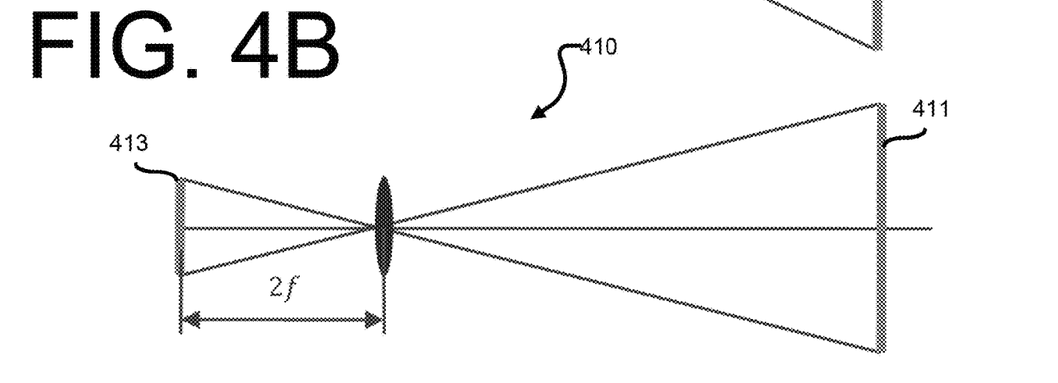
Figure 4C:
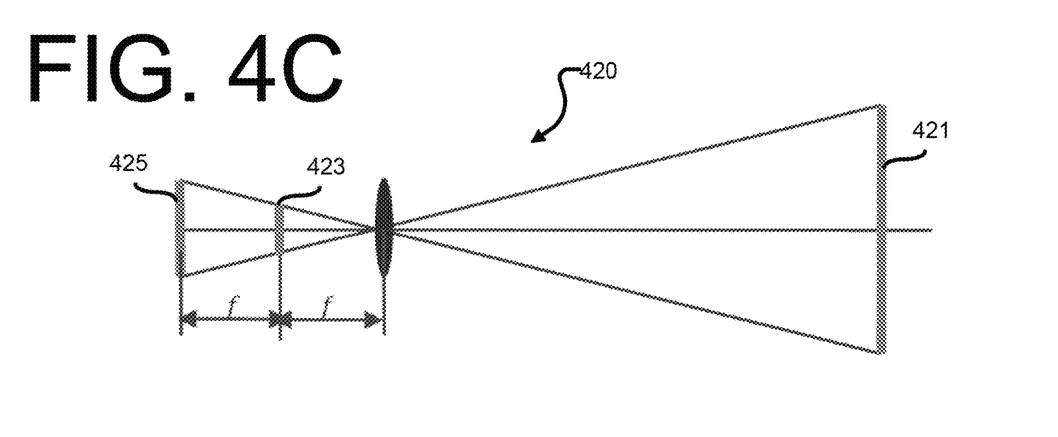

At an operation 283, a virtual camera model for guiding the depth filter is generated, where the camera model is used to guide reconstruction of the depth map. FIG. 4 of this disclosure provides an example overview of the generation of a virtual camera model. At an operation 284, an image-guided Gaussian filter for recovering depth points from the low-resolution depth map generated at the operation 281 is configured based on the weights computed at the operation 282 and the camera model created at the operation 283. At an operation 285, the filter is applied to the low-resolution depth map generated at the operation 281 to create a higher-resolution dense depth map 286.

Referring to the non-limiting example of FIG. 2, the three-dimensional reconstruction stage 290 re-expresses the data of a dense depth map (including an atomized set of data points associating coordinate values with depth values) as a mesh or other format defining a set of interconnected planes corresponding to the three-dimensional surfaces of the real-world scene captured by the first and second image data 211 and 212. Stated differently, the three-dimensional reconstruction stage 290 generates shapes corresponding to one or more solid planes of the real-world scene.

According to various embodiments, at an operation 291, the processing platform implementing the three-dimensional reconstruction stage 290 computes values of a truncated signed distance function (TSDF) based on the surface normal and dense depth map to generate one or more voxel grids for at least a portion of the dense depth map. A voxel grid may include a grid or raster of coordinate regions (such as pixel-like regions), each of which is associated with a depth value (rather than a value in a color space; as is the case for pixels of a digital image). By calculating the TSDF at the operation 291, the processing platform expands the dense depth cloud data, which only defines a depth value at discrete points of zero area within the image frame, to define regions of non-zero area associated with a depth value.

Typically, a voxel grid includes a grid or matrix of square or hexagonal voxels that define areas associated with depth values, where edges of each defined area correspond to the shape of the voxel. As such, the voxel grid, while "linking up" the points of a depth map, may not accurately represent object boundaries or edges of objects in a real-world operating environment. Accordingly, at the operation 291, the voxel grid is further processed to obtain a three-dimensional reconstruction 292, such as by including a three-dimensional mesh of depth points connected by lines to define planar regions (typically triangles) within part or all of the real-world operating environment described by the one or more voxel grids. Techniques suitable for incrementing and deepening a mesh of three-dimensional forms obtained from depth data according to this disclosure include, without limitation, advancing front techniques and automatic hex-mesh generation.

Having developed machine-level understandings of both the 6DOF pose 242 of the AR or XR display and the three-dimensional structure of the scene, at an operation 293, the processing platform renders one or more virtual objects at one or more positions and with one or more poses within a frame of the AR or XR display. This is done such that each virtual object appears to be interacting with one or more real-world objects in the AR or XR display (such as by appearing to sit on the surface of a real-world object).

As noted elsewhere in this disclosure, technical challenges associated with presenting an AR or XR display at a mobile, battery-powered processing platform include, without limitation, marshalling processing and memory resources to perform depth estimation and scene reconstruction as necessary while, at the same time, avoiding degrading other dimensions of system performance, such as frame rate, battery life, and processor use. To address these technical challenges, some embodiments according to this disclosure leverage the architecture of U-net networks for performing feature mapping at the feature mapping stage 230 and disparity mapping at the disparity mapping stage 260. According to some embodiments, node structure U-nets include a tiered set of downsampling layers and a corresponding tiered set of upsampling layers. When represented in a node diagram, these layers form a "V" or "U" shape, hence the name "U-net." The tiered structure of the U-net creates a plurality of segmentation branches, each of which outputs segmentation at different levels of granularity. A consequence of this architecture is that, in a U-net architecture, the depth of the classification performed by the network can be tuned by increasing or decreasing the number of segmentation branches used to obtain a classification output from the network. In this way, users are able to configure the U-net to realize different combinations of processing speed and accuracy by opting to pull results that do not use the full depth of the U-net's analysis.

Referring to the illustrative example of FIG. 2, the architecture 200 also includes a stage 295 for providing feature maps from the feature mapping stage 230 to the disparity mapping stage 260. According to various embodiments, the stage 295 receives information associated with the current status of the processing platform (such as the amount of time before a next frame needs to be rendered or information about the processing load associated with other applications executing at the processor). Based on the received information indicating the current status of the processing platform, the stage 295 obtains the first and second feature maps 234 and 235, where the depth of the processing used to generate the first and second feature maps 234 and 235 depends on the status information. Thus, where the received status information indicates, for example, adequate time before a next AR or XR frame needs to be rendered or minimal processing load from other applications, "deeper" versions of the first and second feature maps 234 and 235 are passed to the disparity mapping stage 260. These "deeper" versions of the first and second feature maps 234 and 235 may be based on most or all of the segmentation branches of the U-net. Conversely, where the status information indicates, for example, a shortage of time until a next AR or XR frame is needed or limited available processing resources, an intermediate feature map based on fewer segmentation branches of the U-net may be passed to the disparity mapping stage 260.

As shown in FIG. 2, in some embodiments, the architecture 200 further includes a stage 296 for obtaining a disparity map at a load-and-contextually appropriate depth. As discussed elsewhere, in some embodiments, a neural network with a U-net architecture can be used to perform a distance-based cost volume calculation based on the first and second feature maps 234 and 235. Further, the calculation performed at the operation 261 may be performed using a disparity factor, which specifies the depth of the results obtained from the U-net. Here again, the disparity factor may be tuned according to information indicating the current status of the processing platform, where the disparity factor is set to a higher value when time or processing resources are comparatively plentiful and decremented when time or processing resources are scarcer.

Although FIG. 2 illustrates one example of an architecture for 200 performing three-dimensional scene reconstruction, various changes may be made to FIG. 2. For example, various components may be combined, further subdivided, replicated, omitted, or rearranged and additional components may be added according to particular needs.

Figure 3:
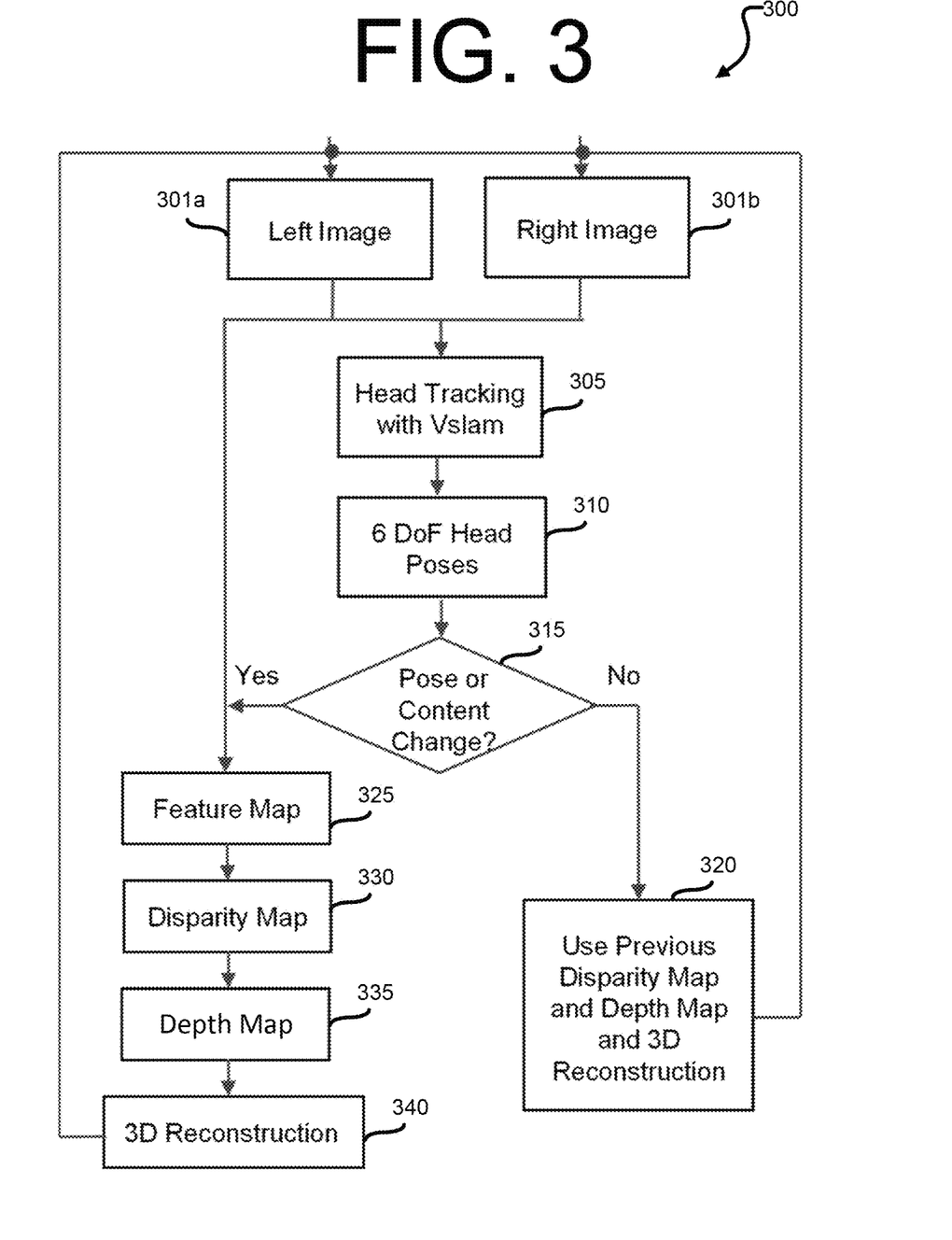
FIG. 3 illustrates an example of an architecture for performing three-dimensional scene reconstruction on an as-needed basis according to some embodiments of this disclosure.

FIG. 3 illustrates an example of an architecture 300 for performing three-dimensional scene reconstruction on an as-needed basis according to some embodiments of this disclosure. The operations described with reference to FIG. 3 may be performed by any suitably-configured processing platform(s), such as a pair of AR or XR glasses, smartphone, smartphone communicatively connected to and operating as an accessory device with AR or XR glasses, or other device 100 in FIG. 1.

Referring to the non-limiting example of FIG. 3, the processing platform implementing the architecture 300 receives, as inputs, image data of a real-world scene from a stereoscopic pair of cameras at a known separation distance. In this example, the processing platform receives a left image 301a and a right image 301b from a camera pair at vantage points that, to the extent possible, are equivalent to those of the AR or XR user's own eyes (such as on the left and right arms of a pair of AR or XR glasses near the wearer's temples). According to various embodiments, the left and right images 301a and 301b may be rectified or otherwise pre-processed to correct for disparities in the images due to various factors (such as variation in focal length or camera orientation) other than differences in vantage point.

At an operation 305, the processing platform passes the left image 301a and the tight image 301b to a VISLAM pipeline (such as the VISLAM pipeline implemented at the operation 241 in FIG. 2). Depending on the embodiment, the VISLAM pipeline may also receive data from one or more motion sensors (such as an IMI) to determine a 6DOF pose 310 for the AR or XR display.

At a battery-powered processing platform, such as a processing platform worn on a user's head, avoiding unnecessary processor tasks can provide meaningful performance gains, both in terms of extending battery life and avoiding heat buildup from running the processor hard. To this end, in various embodiments according to this disclosure, at an operation 315, a determination is performed as to whether at least one of the pose of the apparatus has changed or the content in the image data has changed. This can be done to determine whether an updated three-dimensional reconstruction of the scene is needed. According to various embodiments, a determination of whether the image data has changed may be quickly and efficiently calculated based on a perceptual hash comparing a current frame of image data from one or both of the cameras of the apparatus against a previous frame of image data to obtain a quantification of the frame-over-frame similarity in the image data. The frame-over-frame change in pose may similarly be computed based on the absolute value of the frame-over-frame differences in values between the 6DOF coordinates of the previous and current frames.

Where neither frame-over-frame change in pose or content exceeds one or more threshold values, an operation 320 is performed, where a previously-generated three-dimensional scene reconstruction and depth map are used for positioning and posing one or more items of AR or XR content in the current frame of an AR or XR display. In this way, some embodiments according to this disclosure avoid the unnecessary processing load associated with regenerating an identical scene understanding in the absence of a substantive change in a user's pose or the real-world scene. In real-world implementations where typical users periodically maintain substantially the same pose for multi-second or longer intervals, recycling existing scene reconstructions when there is no need to regenerate the same scene reconstruction translates to readily appreciable gains in battery life.

However, where at least one frame-over-frame difference in the content of the image data or the device's pose exceeds one or more specified thresholds, an operation 325 is performed, where the process of generating a three-dimensional reconstruction based on the left image 301a and the right image 301b begins with generating left and right feature maps. According to various embodiments, at an operation 330, a disparity map may be generated from the feature maps, and a depth map may be generated from the disparity map at an operation 335. In some embodiments, a three-dimensional reconstruction (such as a reconstruction based on a TSDF calculation) of the depth map may be performed at an operation 340. In some embodiments, operations 325-340 may be performed using the architecture 200 in FIG. 2, including relief points for pulling intermediate results from Li-net neural networks used to generate feature maps and the disparity map in response to information indicating a lack of time or processing resources to process further layers of the U-net.

Although FIG. 3 illustrates one example of an architecture 300 for performing three-dimensional scene reconstruction on an as-needed basis, various changes may be made to FIG. 3. For example, various components may be combined, further subdivided, replicated, omitted, or rearranged and additional components may be added according to particular needs.

FIGS. 4A-4C illustrate examples of virtual cameras from which camera models for generating dense depth maps may be obtained according to some embodiments of this disclosure. In particular, FIGS. 4A-4C illustrate aspects of relationships between image density, focal length, and fields of view of a pinhole camera as explanatory examples of using a virtual camera model to determine pose differential weights for configuring a filter for reconstructing a dense depth map from a sparse depth map. As described with reference to FIG. 2, in some embodiments according to this disclosure, an image-guided depth filter is used (such as at the operation 285 in FIG. 2) to generate a dense depth map based on weights associated with image differences in the neighborhood of each depth point of a sparse depth map and a virtual camera model (which expresses pose differences in the neighborhood of each depth point). In this way, some embodiments according to this disclosure complete or "fill in" the dense depth map in a way that better captures the boundaries of three-dimensional objects in the scene than interpolation-based approaches.

Referring to the illustrative example of FIG. 4A, a first pinhole camera 400 is shown. In this example, the first pinhole camera 400 has a focal length f, resulting in a first field of view 401 projecting onto a first image plane 403. Similarly, in the illustrative example of FIG. 4B, a second pinhole camera 410 has a focal length of 2f (such as twice that of the first pinhole camera), resulting in a second field of view 411 that is half the height of the first field of view 401. The second field of view 411 projects onto a second image plane 413, which is of equivalent size to the first image plane 403. Referring to the illustrative example of FIG. 4C, a third pinhole camera 420 is shown, where the third pinhole camera 420 projects a third field of view 421 upon a first image plane 423 disposed at a focal length of f and upon a second image plane 425 disposed at a focal length of 2f.

In the illustrative example of FIG. 4C, the second image plane 425 is twice as wide as the first image plane 423 and thus has four times as much area. Assuming the aperture of the third pinhole camera 420 is sufficiently small (such as small enough to ensure that images projected at f and 2f are in focus), the image density of the image in the first image plane 423 is four times that of the same image at the second image plane 425. An image density may represent a ratio of points of image data to area. Because the same image is projected over the first image plane 423 (which has a quarter of the area of the second image plane 425), the image density at the first image plane 423 is four times that of the image density at the second image plane 425. For each of the pinhole cameras 400, 410 and 420, the focal length and directionality of the camera (such as a coordinate in the image plane to which the center of the field of view is projected) can be expressed according to a camera matrix.

As discussed elsewhere in this disclosure, in some embodiments, generation of the dense depth map from the spare depth map is performed using an image-guided Gaussian filter, such as based on local differentials in, for example, the image data and pose in the neighborhoods of the existing points of the sparse depth map. According to various embodiments, changes in resolution may be modeled as changes in the focal length of a virtual camera and can be expressed through a camera matrix.

According to various embodiments, a high-resolution depth map may be modeled as the output of a virtual camera having a first camera matrix K. One example of this camera matrix is shown in Equation 1 below:

$$K = \begin{bmatrix} f_x & 0 & c_x \\ 0 & f_y & c_y \\ 0 & 0 & 1 \end{bmatrix}$$ Equation 1

Here, $f_x$ is the value of the virtual camera's focal length in the x-dimension, $f_y$ is the value of the virtual camera's focal length in the y-dimension, and ($c_x$, $c_y$) is a coordinate value of the principal point of the virtual camera. According to various embodiments, changing the image density (such as the number of data points for a given unit of area) of the virtual camera may be modeled by applying a scaling factor λ to the camera matrix K. Thus, as an illustrative example, when downsampling a higher-resolution depth map to a lower resolution according to a scaling factor λ (where λ<1), the downsampling operation can be modeled by applying the scaling factor λ to the camera matrix K to obtain a new virtual camera model expressed by a camera matrix $K_d$. An example of this is shown in Equation 2 below:

$$K_d = \begin{bmatrix} \lambda f_x & 0 & \lambda c_x \\ 0 & \lambda f_y & \lambda c_y \\ 0 & 0 & 1 \end{bmatrix}$$ Equation 2

Coordinate values of a depth map, expressed as x and y values in a two-dimensional frame associated with a depth value d, can be determined from camera pose values (expressed as a vector having components along the X, Y, and Z axes). An example of this is shown in Equation 3 below.

$$\begin{bmatrix} x \\ y \\ d \end{bmatrix} = K \begin{bmatrix} X \\ Y \\ Z \end{bmatrix} \text{ and } \begin{bmatrix} X \\ Y \\ Z \end{bmatrix} = K^{-1} \begin{bmatrix} x \\ y \\ d \end{bmatrix}$$ Equation 3

In this example, (X, Y, Z) is a vector the current camera pose with the higher-resolution depth map, and ($X_d$, $Y_d$, $Z_d$) is a vector expressing corresponding camera pose in a lower-resolution depth map. According to some embodiments, the processing platform generating a dense depth map may create a weight W for filtering depths in the neighborhood of a depth point of a low-density depth map using a Gaussian filter based on the pose difference pdiff between the camera pose associated with the high-resolution depth map and the low resolution depth map, one example of this is specified by Equation 4 below:

$$W = a e^{-\frac{(pdiff - \mu)^2}{2\sigma^2}}$$ Equation 4

Here, pdiff=norm((X, Y, Z)−($X_d$, $Y_d$, $Z_d$)), norm(•) is a norm of the vector associated with a pose difference between the pose associated with the higher-resolution depth map and the pose associated with the lower resolution depth map, a is a coefficient (α=1 may be used in this example), and (μ, σ) are Gaussian distribution parameters.

Although FIGS. 4A-4C illustrate examples of virtual cameras from which camera models for generating dense depth maps may be obtained, various changes may be made to FIGS. 4A-4C, For example, other virtual camera models may be used depending on the implementation.

Figure 5:
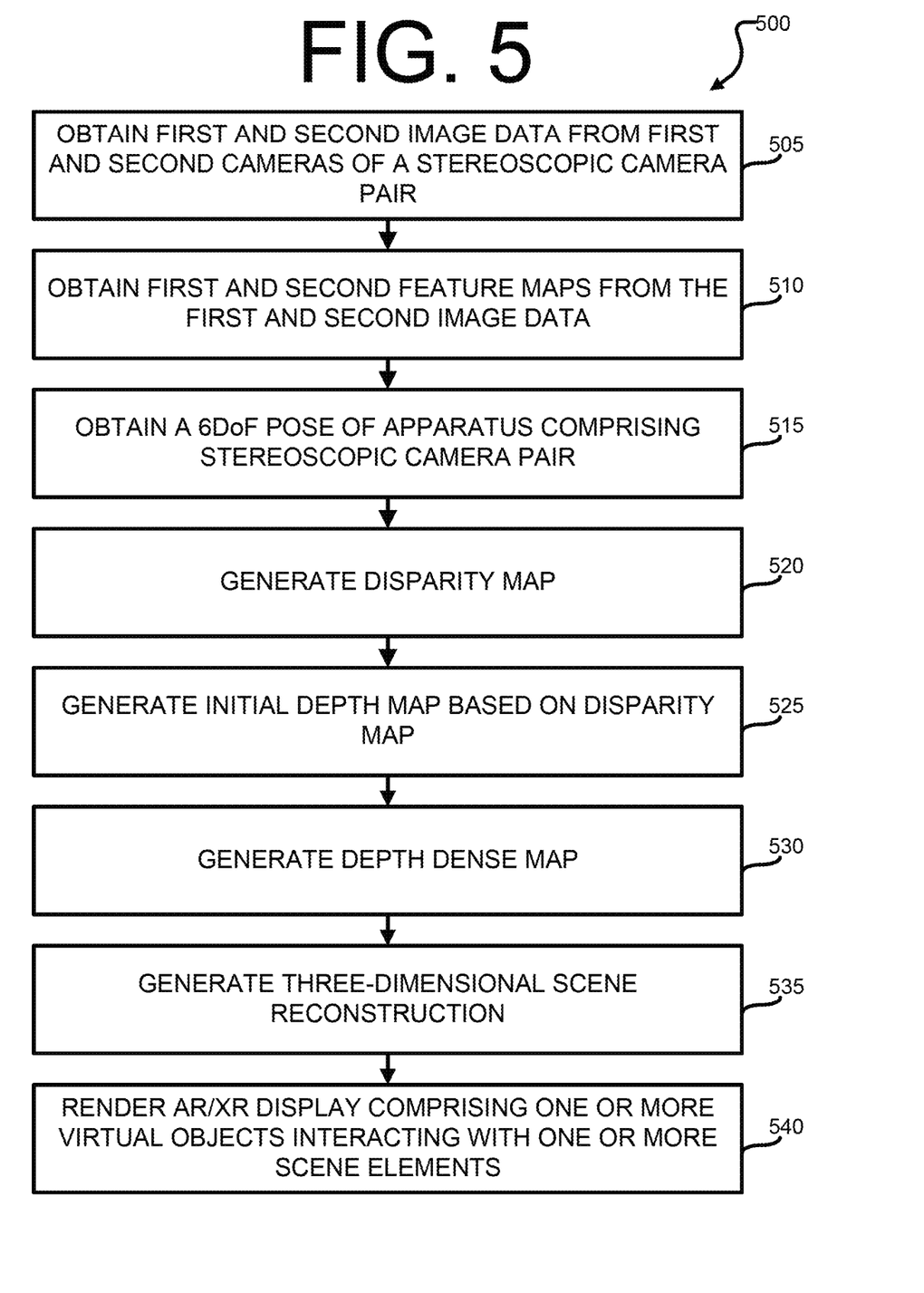
FIG. 5 illustrates operations of an example method for performing three-dimensional scene reconstruction according to some embodiments of this disclosure.

FIG. 5 illustrates operations of an example method 500 for performing three-dimensional scene reconstruction according to some embodiments of this disclosure. The operations described with reference to FIG. 5 may be performed by any suitably-configured processing platform (s), such as a pair of AR or XR glasses, smartphone, smartphone communicatively connected to and operating as an accessory device with AR or XR glasses, or other device 100 in FIG. 1.

Referring to the non-limiting example of FIG. 5, at an operation 505, the processing platform obtains first and second image data (such as the first and second image data 211 and 212 in FIG. 2) from first and second cameras of a stereoscopic pair. According to various embodiments, the operation 505 may further include rectifying the obtained image data to eliminate disparities between the first and second image data due to causes other than parallax effects and differences in perspective between the first and second cameras.

At an operation 510, first and second feature maps (such as the first and second feature maps 234 and 235 in FIG. 2) are generated from the first and second image data. In some embodiments, the feature maps are obtained by passing the image data though a neural network having a U-net architecture, where the depth of the results can be dynamically tuned based on a downsampling factor. Thus, in cases where time or processing resources are plentiful, the feature maps may be generated at a higher level of accuracy by utilizing more of the depth of the model. In cases where time or processing resources are scarce, a quicker or computationally less demanding feature map may be obtained by not using all of the segmentation branches of the U-net.

At an operation 515, the processing platform Obtains a six-degree-of-freedom (6DOF) pose value for the apparatus including the stereoscopic pair of cameras providing the first and second image data. In some embodiments, the 6DOF pose may be obtained based solely on image data. In other embodiments, the apparatus further includes one or more IMUs or other sensors for tracking location and acceleration in one or more degrees of freedom. Accordingly, in some embodiments, visual and inertial sensor data is provided, such as to a VISLAM pipeline, in order to obtain a current value of the pose of the apparatus.

At an operation 520, the processing platform generates, based on the feature maps and the current pose of the apparatus, a disparity map. According to various embodiments, the disparity map provides a quantification of the differences in frame location between matched features of the first and second feature maps. At an operation 525, an initial depth map is generated based on the disparity map. In some embodiments, the depth values of the initial depth map may be determined analytically, such as a function of the separation distance between the cameras of the stereoscopic pair, the focal length of the camera pair, and the inverse of the disparity value between matched features.

At an operation 530, a dense depth map may be generated, such as by applying a Gaussian filter, to determine weights based on pose and image differences in the neighborhoods of existing points of the sparse depth map. According to some embodiments, the pose differences may be modeled according to a virtual camera model expressing the difference in data density between the sparse depth map and the dense depth map as a change in pose.

At an operation 535, a three-dimensional scene reconstruction is generated based on the dense depth map. In some embodiments, generation of a three-dimensional scene reconstruction includes computing a TSDF function of the dense depth map to convert an atomized point cloud of depth data to voxels, or regions associated with depth values, and further refining the voxel representation of the real-world scene as a three-dimensional mesh. At an operation 540, the processing platform applies the three-dimensional scene reconstruction to render a frame of an AR or XR display, which includes one or more virtual objects rendered at one or more poses and one or more positions within the frame of the AR or XR display. This can be performed such that each virtual object appears to interact with one or more real-world objects in the AR or XR display. For example, in some embodiments, each virtual object may be positioned and posed to appear to contact one or more surfaces of the real-world scene (such as by sitting upon a horizontal plane or appearing to be affixed to a vertical plane).

Although FIG. 5 illustrates operations of one example method 500 for performing three-dimensional scene reconstruction, various changes may be made to FIG. 5. For example, while shown as a series of steps, various steps in FIG. 5 may overlap, occur in parallel, occur in a different order, or occur any number of times. Also, various steps may be omitted or replaced by other steps.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method for obtaining a three-dimensional scene reconstruction and dense depth map for an augmented reality (AR) or extended reality (XR) display comprising:
   obtaining, at a first time, first image data of a real-world scene from a first camera of a stereoscopic pair of an apparatus and second image data of the real-world scene from a second camera of the stereoscopic pair;
   performing feature extraction on the first image data to obtain a first feature map;
   performing feature extraction on the second image data to obtain a second feature map;
   performing pose tracking based on at least one of the first image data, the second image data, and pose data from an inertial measurement unit (IMU) of the apparatus to obtain a six-degree-of-freedom (6DOF) pose of the apparatus;
   generating, based on the 6DOF pose of the apparatus, the first feature map, and the second feature map, a disparity map between the first and second image data;
   generating an initial depth map based on the disparity map;
   generating a dense depth map of the real-world scene by applying an image-guided filter to one or more points of the initial depth map, wherein the image-guided filter is configured using a virtual camera model based on a difference in a pose of the apparatus associated with the initial depth map and a pose of the apparatus associated with the dense depth map;
   generating, based on the dense depth map, a three-dimensional reconstruction of at least part of the real-world scene; and
   rendering an AR or XR display, wherein the AR or XR display comprises one or more virtual objects positioned to contact one or more real-world surfaces of the three-dimensional reconstruction of at least part of the real-world scene;
   wherein each of the one or more virtual objects is associated with a virtual object pose within the AR or XR display; and
   wherein each virtual object pose describes a position and an orientation of one of the one or more virtual objects within a 6DOF coordinate system.

2. The method of claim 1, further comprising:
   obtaining an apparatus status associated with a current processing load at the apparatus;
   wherein performing the feature extractions comprises performing a first convolution on the first and second image data and applying a downsampling factor prior to performing a second convolution, the downsampling factor based on the apparatus status.

3. The method of claim 1, further comprising:
obtaining, at a second time subsequent to the first time, second pose data from the IMU;
comparing the pose data obtained at the first time to the second pose data obtained at the second time to generate a change value; and
responsive to the change value being less than a threshold value, rendering a second AR or XR display, wherein the second AR or XR display comprises the one or more virtual objects positioned to contact the one or more real-world surfaces of the three-dimensional reconstruction of at least part of the real-world scene.

4. The method of claim 1, wherein the first and second feature maps are determined using a convolutional neural network having a U-net architecture, the U-net architecture configured to generate intermediate feature maps accessible for generating disparity maps.

5. The method of claim 1, wherein:
the first image data of the real-world scene and the second image data of the real-world scene comprise data in a plurality of channels of a color space; and
the image-guided filter is configured to generate the dense depth map of the real-world scene by extending the initial depth map around points of the initial depth map where the first image data and the second image data show consistency across multiple channels of the color space.

6. A method for obtaining a three-dimensional scene reconstruction and dense depth map for an augmented reality (AR) or extended reality (XR) display comprising:
obtaining, at a first time, first image data of a real-world scene from a first camera of a stereoscopic pair of an apparatus and second image data of the real-world scene from a second camera of the stereoscopic pair;
performing feature extraction on the first image data to obtain a first feature map;
performing feature extraction on the second image data to obtain a second feature map;
performing pose tracking based on at least one of the first image data, the second image data, and pose data from an inertial measurement unit (IMU) of the apparatus to obtain a six-degree-of-freedom (6DOF) pose of the apparatus;
generating, based on the 6DOF pose of the apparatus, the first feature map, and the second feature map, a disparity map between the first and second image data;
generating an initial depth map based on the disparity map;
generating a dense depth map of the real-world scene based on the initial depth map and a camera model of the apparatus;
generating, based on the dense depth map, a three-dimensional reconstruction of at least part of the real-world scene; and
rendering an AR or XR display, wherein the AR or XR display comprises one or more virtual objects positioned to contact one or more surfaces of the three-dimensional reconstruction of at least part of the real-world scene;
wherein generating the dense depth map of the real-world scene comprises:
reprojecting the initial depth map based on the camera model, wherein the camera model comprises a camera matrix specifying one or more focal length values and one or more principal point coordinates multiplied by a scaling factor associated with a change in focal depth; and
applying a Gaussian filter to assign weights to depth points of the reprojected initial depth map to obtain the dense depth map, the Gaussian filter based on at least one of the first and second image data.

7. A method for obtaining a three-dimensional scene reconstruction and dense depth map for an augmented reality (AR) or extended reality (XR) display comprising:
obtaining, at a first time, first image data of a real-world scene from a first camera of a stereoscopic pair of an apparatus and second image data of the real-world scene from a second camera of the stereoscopic pair;
performing feature extraction on the first image data to obtain a first feature map;
performing feature extraction on the second image data to obtain a second feature map;
performing pose tracking based on at least one of the first image data, the second image data, and pose data from an inertial measurement unit (IMU) of the apparatus to obtain a six-degree-of-freedom (6DOF) pose of the apparatus;
generating, based on the 6DOF pose of the apparatus, the first feature map, and the second feature map, a disparity map between the first and second image data;
generating an initial depth map based on the disparity map;
generating a dense depth map of the real-world scene based on the initial depth map and a camera model of the apparatus;
generating, based on the dense depth map, a three-dimensional reconstruction of at least part of the real-world scene; and
rendering an AR or XR display, wherein the AR or XR display comprises one or more virtual objects positioned to contact one or more real-world surfaces of the three-dimensional reconstruction of at least part of the real-world scene;
wherein each of the one or more virtual objects is associated with a virtual object pose within the AR or XR display;
wherein each virtual object pose describes a position and an orientation of one of the one or more virtual objects within a 6DOF coordinate system; and
wherein generating the disparity map between the first and second image data comprises:
obtaining an apparatus status associated with a current processing load at the apparatus;
performing distance-based cost volume matching between the first and second feature maps, wherein matches between features of the first and second feature maps are determined based on a scalable disparity factor; and
adjusting the scalable disparity factor based on the apparatus status.

8. The method of claim 7, wherein the current processing load at the apparatus scales linearly with the scalable disparity factor.

9. An apparatus comprising:
a stereoscopic pair of cameras comprising a first camera and a second camera;
an inertial measurement unit (IMU); and
at least one processing device configured to:
obtain, at a first time, first image data of a real-world scene from the first camera and second image data of the real-world scene from the second camera;

perform feature extraction on the first image data to obtain a first feature map;

perform feature extraction on the second image data to obtain a second feature map;

perform pose tracking based on at least one of the first image data, the second image data, and pose data from the IMU to obtain a six-degree-of-freedom (6DOF) pose of the apparatus;

generate, based on the 6DOF pose of the apparatus, the first feature map, and the second feature map, a disparity map between the first and second image data;

generate an initial depth map based on the disparity map;

generate a dense depth map of the real-world scene by applying an image-guided filter to one or more points of the initial depth map, wherein the image-guided filter is configured using a virtual camera model based on a difference in a pose of the apparatus associated with the initial depth map and a pose of the apparatus associated with the dense depth map;

generate, based on the dense depth map, a three-dimensional reconstruction of at least part of the real-world scene; and render an AR or XR display, wherein the AR or XR display comprises one or more virtual objects positioned to contact one or more real-world surfaces of the three-dimensional reconstruction of at least part of the real-world scene;

wherein each of the one or more virtual objects is associated with a virtual object pose within the AR or XR display; and wherein each virtual object pose describes a position and an orientation of one of the one or more virtual objects within a 6DOF coordinate system.

10. The apparatus of claim 9, wherein:

the at least one processing device is further configured to obtain an apparatus status associated with a current processing load at the apparatus; and to perform the feature extractions, the at least one processing device is configured to perform a first convolution on the first and second image data and apply a downsampling factor prior to performing a second convolution, the downsampling factor based on the apparatus status.

11. The apparatus of claim 9, wherein the at least one processing device is further configured to:

obtain, at a second time subsequent to the first time, second pose data from the IMU;

compare the pose data obtained at the first time to the second pose data obtained at the second time to generate a change value; and responsive to the change value being less than a threshold value, render a second AR or XR display, wherein the second AR or XR display comprises the one or more virtual objects positioned to contact the one or more real-world surfaces of the three-dimensional reconstruction of at least part of the real-world scene.

12. The apparatus of claim 9, wherein:

the at least one processing device is further configured to reproject the initial depth map based on the virtual camera model, wherein the virtual camera model comprises a camera matrix specifying one or more focal length values and one or more principal point coordinates multiplied by a scaling factor associated with a change in focal depth; and wherein the image-guided filter is a Gaussian filter, the at least one processing device configured to apply the Gaussian filter to assign weights to depth points of the reprojected initial depth map to obtain the dense depth map, the Gaussian filter based on at least one of the first and second image data.

13. The apparatus of claim 9, wherein the at least one processing device is further configured to:

obtain an apparatus status associated with a current processing load at the apparatus;

perform distance-based cost volume matching between the first and second feature maps, wherein matches between features of the first and second feature maps are determined based on a scalable disparity factor; and adjust the scalable disparity factor based on the apparatus status.

14. The apparatus of claim 13, wherein the current processing load at the apparatus scales linearly with the scalable disparity factor.

15. The apparatus of claim 9, wherein the at least one processing device is configured to determine the first and second feature maps using a convolutional neural network having a U-net architecture, the U-net architecture configured to generate intermediate feature maps accessible for generating disparity maps.

16. A non-transitory computer-readable medium containing instructions that, when executed by at least one processor of an apparatus comprising a stereoscopic pair of cameras including a first camera and a second camera and an inertial measurement unit (IMU), cause the apparatus to:

obtain, at a first time, first image data of a real-world scene from the first camera and second image data of the real-world scene from the second camera;

perform feature extraction on the first image data to obtain a first feature map;

perform feature extraction on the second image data to obtain a second feature map;

perform pose tracking based on at least one of the first image data, the second image data, and pose data from the IMU to obtain a six-degree-of-freedom (6DOF) pose of the apparatus;

generate, based on the 6DOF pose of the apparatus, the first feature map, and the second feature map, a disparity map between the first and second image data;

generate an initial depth map based on the disparity map;

generate a dense depth map of the real-world scene by applying an image-guided filter to one or more points of the initial depth map, wherein the image-guided filter is configured using a virtual camera model based on a difference in a pose of the apparatus associated with the initial depth map and a pose of the apparatus associated with the dense depth map;

generate, based on the dense depth map, a three-dimensional reconstruction of at least part of the real-world scene; and render an AR or XR display, wherein the AR or XR display comprises one or more virtual objects positioned to contact one or more real-world surfaces of the three-dimensional reconstruction of at least part of the real-world scene;

wherein each of the one or more virtual objects is associated with a virtual object pose within the AR or XR display; and wherein each virtual object pose describes a position and an orientation of one of the one or more virtual objects within a 6DOF coordinate system.

17. The non-transitory computer-readable medium of claim 16, further containing instructions that, when executed by the at least one processor, cause the apparatus to obtain an apparatus status associated with a current processing load at the apparatus;
   wherein the instructions that when executed cause the apparatus to perform the feature extractions comprise instructions that when executed cause the apparatus to perform a first convolution on the first and second image data and apply a downsampling factor prior to performing a second convolution, the downsampling factor based on the apparatus status.

18. The non-transitory computer-readable medium of claim 16, further containing instructions that, when executed by the at least one processor, cause the apparatus to:
   obtain, at a second time subsequent to the first time, second pose data from the IMU;
   compare the pose data obtained at the first time to the second pose data obtained at the second time to generate a change value; and
   responsive to the change value being less than a threshold value, render a second AR or XR display, wherein the second AR or XR display comprises the one or more virtual objects positioned to contact the one or more real-world surfaces of the three-dimensional reconstruction of at least part of the real-world scene.

19. The non-transitory computer-readable medium of claim 16, further containing instructions that, when executed by the at least one processor, cause the apparatus to reproject the initial depth map based on the virtual camera model, wherein the virtual camera model comprises a camera matrix specifying one or more focal length values and one or more principal point coordinates multiplied by a scaling factor associated with a change in focal depth;
   wherein the image-guided filter is a Gaussian filter, wherein the instructions when executed cause the at least one processor to apply the Gaussian filter to assign weights to depth points of the reprojected initial depth map to obtain the dense depth map, the Gaussian filter based on at least one of the first and second image data.

20. The non-transitory computer-readable medium of claim 16, further containing instructions that, when executed by the at least one processor, cause the apparatus to:
   obtain an apparatus status associated with a current processing load at the apparatus;
   perform distance-based cost volume matching between the first and second feature maps, wherein matches between features of the first and second feature maps are determined based on a scalable disparity factor; and
   adjust the scalable disparity factor based on the apparatus status.

21. The non-transitory computer-readable medium of claim 20, wherein the current processing load at the apparatus scales linearly with the scalable disparity factor.

* * * * *